US010251323B2

(12) United States Patent
Knobloch et al.

(10) Patent No.: US 10,251,323 B2
(45) Date of Patent: Apr. 9, 2019

(54) AGRICULTURAL TILLAGE IMPLEMENT WITH SOIL FINISHING SYSTEM HAVING MULTIPLE BAR HARROW AND HYDRAULIC DOWN PRESSURE FOR FINISHING TOOL

(71) Applicant: CNH Industrial America LLC, New Holland, PA (US)

(72) Inventors: Dean A. Knobloch, Tucson, AZ (US); Rick L. Gerber, Roanoke, IL (US)

(73) Assignee: CNH Industrial America LLC, New Holland, PA (US)

( * ) Notice: Subject to any disclaimer, the term of this patent is extended or adjusted under 35 U.S.C. 154(b) by 215 days.

(21) Appl. No.: 15/273,010

(22) Filed: Sep. 22, 2016

(65) Prior Publication Data
US 2018/0077848 A1 Mar. 22, 2018

(51) Int. Cl.
*A01B 49/02* (2006.01)
*A01B 63/32* (2006.01)

(52) U.S. Cl.
CPC ............ *A01B 49/027* (2013.01); *A01B 63/32* (2013.01)

(58) Field of Classification Search
CPC ........ A01B 49/027; A01B 63/32; A01B 19/04
See application file for complete search history.

(56) References Cited

U.S. PATENT DOCUMENTS

| | | | |
|---|---|---|---|
| 5,201,372 A * | 4/1993 | Thompson | A01B 73/02 116/271 |
| 7,766,093 B2 | 8/2010 | Becker et al. | |
| 9,247,687 B2 * | 2/2016 | Gray | A01B 61/044 |
| 9,521,798 B2 * | 12/2016 | Kovach | A01B 49/027 |
| 9,872,422 B2 * | 1/2018 | Sudbrink | A01B 63/14 |
| 2008/0066935 A1 * | 3/2008 | Becker | A01B 63/32 172/13 |
| 2014/0251646 A1 * | 9/2014 | Gray | A01B 61/044 172/1 |
| 2015/0156946 A1 * | 6/2015 | Sudbrink | A01B 63/14 172/1 |
| 2015/0156962 A1 | 6/2015 | Zemenchik et al. | |
| 2017/0079192 A1 * | 3/2017 | Steinlage | A01B 63/245 |
| 2017/0112043 A1 * | 4/2017 | Nair | A01B 63/002 |
| 2017/0181367 A1 * | 6/2017 | Sudbrink | A01B 73/046 |
| 2017/0181368 A1 * | 6/2017 | Sudbrink | A01B 73/046 |
| 2018/0103574 A1 * | 4/2018 | Knobloch | A01B 63/30 |
| 2018/0116095 A1 * | 5/2018 | Knobloch | A01B 49/027 |
| 2018/0139891 A1 * | 5/2018 | Gerber | A01B 63/32 |
| 2018/0139892 A1 * | 5/2018 | Knobloch | A01B 19/04 |

OTHER PUBLICATIONS http://www.remlingermfg.com/3_bar_spring_tine_roller_flex.htm; Remlinger Mfg.; Mounted Harrows-3Bar Spring Tine Roller; 3 pages.
http://www.deere.com/en_US/docs/html/brochures/publication.html?id=49307ba3#14: John Deere; Secondary Tillage Publication; 28 pages.
http://www.caseih.com/northamerica/en-us/products/tillage/vertical-tillage: Vertical Tillage; True-Tandem 335 Barracuda; 10 pages.

* cited by examiner

*Primary Examiner* — Matthew D. Troutman
(74) *Attorney, Agent, or Firm* — Rebecca L. Henkel; Rickard K. DeMille

(57) ABSTRACT

An agricultural tillage implement is provided with a soil finishing system that includes a multi-bar harrow and a down pressure-controlled finishing tool that are arranged with respect to each other to enhance soil tilth and leveling, including reducing residual shank grooves in tilled soil, to improve seed bed preparation.

18 Claims, 3 Drawing Sheets

AGRICULTURAL TILLAGE IMPLEMENT WITH SOIL FINISHING SYSTEM HAVING MULTIPLE BAR HARROW AND HYDRAULIC DOWN PRESSURE FOR FINISHING TOOL

FIELD OF THE INVENTION

The invention relates generally to tillage implements and, in particular, to an agricultural tillage implement with a soil finishing system having a multiple bar harrow and hydraulic down pressure for a finishing tool.

BACKGROUND OF THE INVENTION

Tillage implements such as cultivators are getting larger and more complex over time to improve tilling efficiency and seedbed characteristics. For example, cultivators are getting wider to allow tilling more soil in a single pass, which improves equipment productivity. Shanks and other components of the cultivators are also getting larger and more robust to allow increased travel speeds while tilling, which further improves equipment productivity. Further efforts have been made to improve soil leveling and other seedbed characteristics, such as by incorporating soil finishing systems which may include secondary harrows and/or formed bar baskets behind main tillage tools of the tillage implements. However, final soil leveling can be challenging for cultivators with larger shanks and faster travel speeds, even when soil finishing systems are implemented, which can leave residual grooves in the soil from the shanks.

SUMMARY OF THE INVENTION

An agricultural tillage implement is provided with a soil finishing system that includes a multi-bar harrow and a down pressure-controlled finishing tool that are arranged with respect to each other to enhance soil tilth and leveling, including reducing residual shank grooves in tilled soil and decreasing soil clod size, to improve seed bed preparation.

According to one aspect of the invention, a tillage implement is provided with a soil finishing system having a multiple bar harrow and a down pressure system that applies down pressure to a finishing tool, which may be implemented as a formed bar basket. The multiple bars of the harrow may be implemented as front, back, and intermediate bars, and the down pressure system, may be a hydraulic down pressure system. The agricultural tillage implement may be a cultivator with a soil finish system having a coil tine harrow with three rows, of coil tines and a hydraulic down pressure system that applies down pressure to a formed bar basket, such as a crumbler basket.

According to another aspect of the invention, an agricultural tillage implement is provided that includes a main implement frame supporting a set of ground-engaging tillage tools for tilling soil during a tilling session for seedbed preparation. A soil finish system is supported by the main implement frame for smoothing the soil tilled by the ground-engaging tillage tools. The soil finish system may include a harrow supported in a trailing position with respect to the main implement frame. The harrow may include a harrow frame with multiple bars arranged generally transversely with respect to a travel direction of the agricultural tillage implement with the multiple bars of the harrow frame including a front bar arranged toward a front end of the harrow, a back bar arranged toward a back end of the harrow, and an intermediate bar arranged between the front and back bars of the harrow. The harrow may include a first set of smoothing tools supported by the front, back, and intermediate bars of the harrow frame for smoothing the soil tilled by the ground-engaging tillage tools. A finishing tool may be supported in a trailing position with respect to the harrow and may include a second set of smoothing tools for smoothing the soil tilled by the ground-engaging tillage tools. A down pressure system may be configured to adjust down pressure of the finishing tool during the tilling session.

According to another aspect of the invention, the down pressure system is a hydraulic down pressure system configured to press the finishing tool against the soil. The finishing tool may be a formed bar basket and the second set of smoothing tools may include at least one of flat bars and round bars that at least partially define the formed bar basket. The harrow may be a spring tine harrow. Each of the forward, rear, and intermediate bars of the harrow may support multiple spring tines that define the first set of smoothing tools.

According to another aspect of the invention, the harrow may include a harrow arm connected to the main implement frame and the harrow may define a nonuse position in which the harrow frame is generally freely suspended from the harrow arm. The finishing tool may include a formed bar basket supported by a finishing tool arm that is attached to the harrow arm at a finishing tool arm pivot connection. The finishing tool arm pivot connection may be arranged generally above the intermediate bar when the harrow is in the nonuse position.

According to another aspect of the invention, the harrow is a spring tine harrow that includes a harrow arm connected to a main implement frame, and a pair of harrow locating arms attaches the harrow arm to the harrow frame at a corresponding pair of harrow locating arm pivot connections. The finishing tool may be a formed bar basket finishing tool that includes a finishing tool arm connected to the harrow arm at a finishing tool arm pivot connection with a pivot axis that extends transversely through the harrow arm, with the finishing tool arm extending from the finishing tool arm pivot connection rearwardly beyond the harrow arm. A hydraulic down pressure system may be configured to move the finishing tool arm to press the formed bar basket against the soil.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
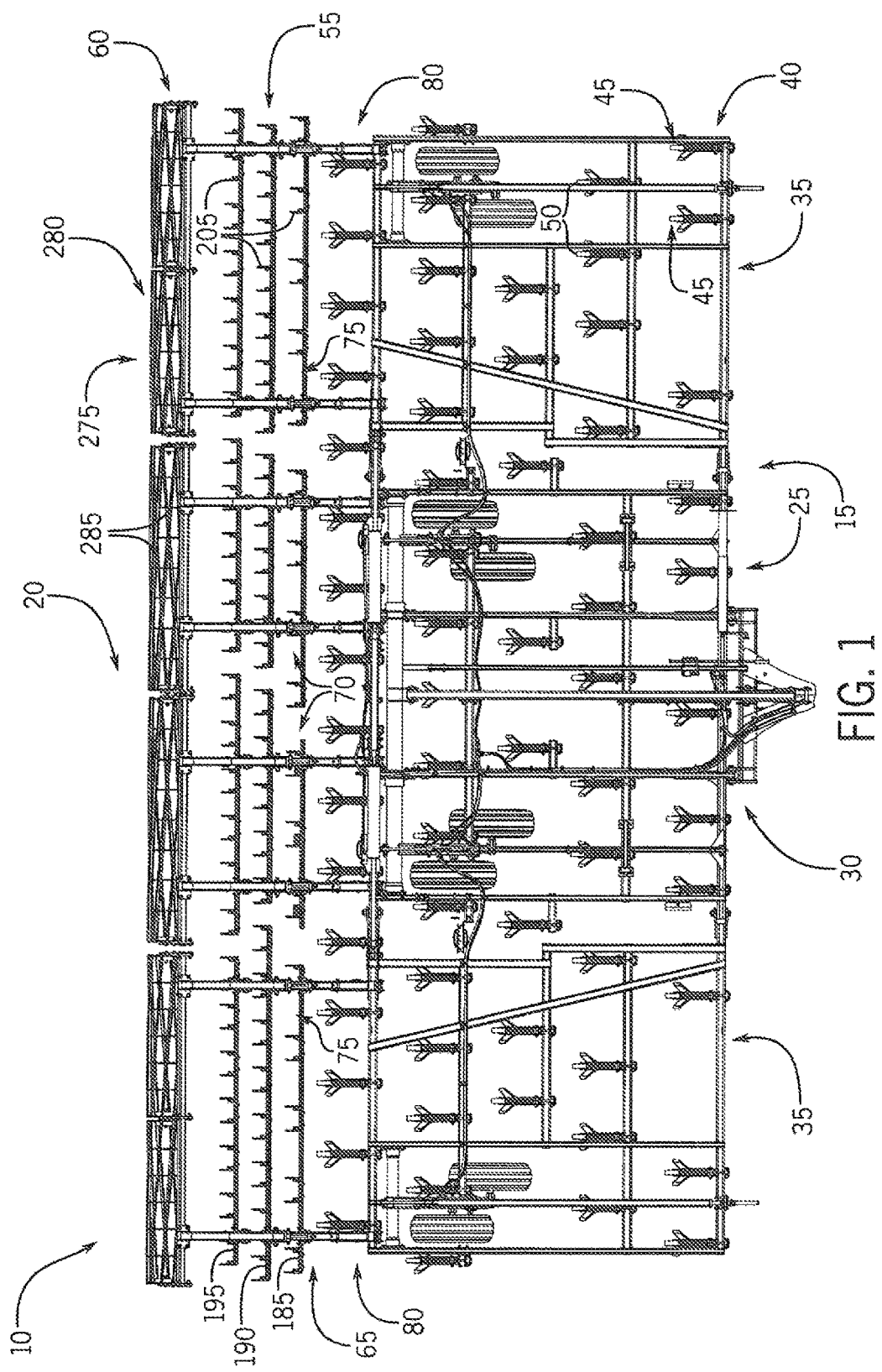
FIG. 1 is a top plan view of an agricultural tillage implement with a soil finishing system having a multiple bar harrow and hydraulic down pressure for a finishing tool according to the present invention.

Referring now to the drawings and specifically to FIG. 1, agricultural tillage implement 10 is towable by a tractor (not shown) or other vehicle and is shown with main tillage implement 15 and soil finishing system 20 that improves soil leveling, as explained in greater detail elsewhere herein. Main tillage implement 15 is shown here as a cultivator with main implement frame 25 that has multiple sections, represented as main frame section 30 and outer wing sections 35 on opposite sides of main frame section 30. Main implement frame 25 supports a set of ground-engaging tillage tools 40 for tilling soil during a tilling session for seedbed preparation. Tillage tools 40 are shown here as sweeps 45 mounted to shanks 50 that are attached to main implement frame 25. Although shown as sweeps 45 mounted to shanks 50, it is understood that ground-engaging tillage tools 40 may be other ground-engaging tillage tools, such as coulters, disks, and rippers.

Still referring to FIG. 1, finishing system 20 is shown with harrow 55 arranged trailing behind tillage implement 10 and finishing tool 60 arranged trailing behind harrow 55. Harrow 55 is shown as coil tine harrow 65 with multiple sections, shown as intermediate harrow sections 70 and outer harrow sections 75 on opposite sides of intermediate harrow sections 70.

Figure 2:
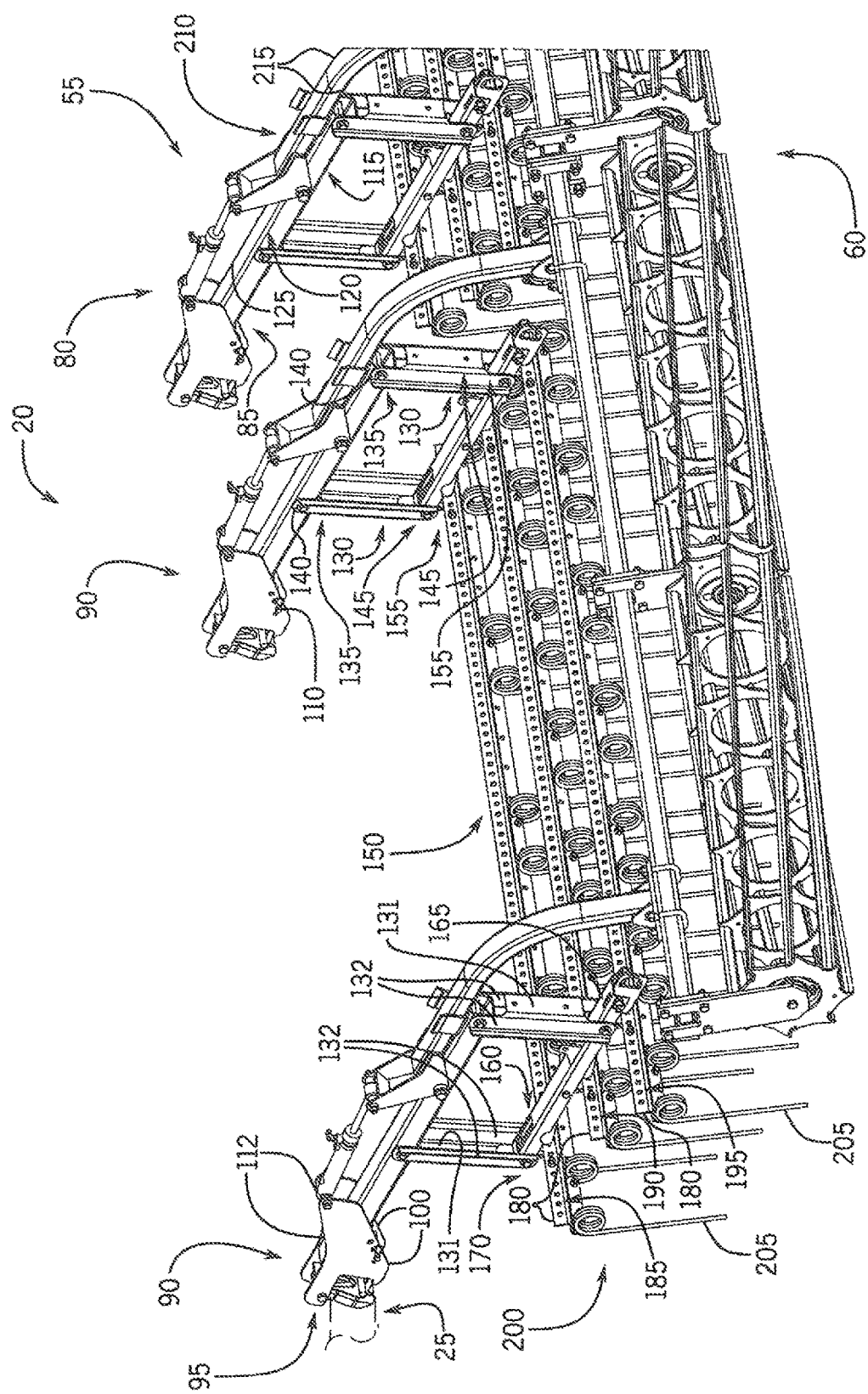
FIG. 2 is an isometric view of the soil finishing system of FIG. 1.

Referring now to FIG. 2, each harrow section 70, 75 (FIG. 1) includes at least one harrow arm 80 with front end 85 with bracket 90 arranged at front end 85. Bracket 90 has front section 95 that is attached to the main implement frame 25 and lower flanges 100 arranged on opposite sides of the harrow arm 80 with mounting holes 105 (FIG. 3) through which pin 110 extends. Lobes 112 extend up and rearward at an angle from bracket front section 95 and lower flanges 100 above harrow arm 80 rearward of pin 110.

Still referring to FIG. 2, harrow arm back end 115 is spaced from main implement frame 25, and harrow arm intermediate segment 120 extends between front and back ends 85, 115. Harrow arm 80 is shown as rectangular tubing with interconnected walls 125 that together provide a box configuration of harrow arm 80. A pair of parallel harrow locating arms 130 provides a parallel linkage system that connects the harrow arm 80 to the rest of harrow 55. Harrow locating arms 130 are shown with open channel construction(s) defined by main wall 131 that extends transversely between a pair of side walls 132. The pair of locating arms 130 at each respective harrow arm 80 are shown arranged facing opposite directions, with main wall 131 of the front locating arm 130 defining a front wall that faces toward implement frame 25 and main wall 131 of the rear locating arm 130 defining a back wall that faces away from implement frame 25.

Still referring to FIG. 2, harrow locating arms 130 have upper ends 135 that attach to each harrow arm 80 at a corresponding pair, of upper harrow locating arm pivot connections 140, with the back upper harrow locating arm pivot connection 140 arranged at the harrow arm back end 115 and the front upper harrow locating arm pivot connection 140 at the harrow arm intermediate segment 120. Harrow arm lower ends 145 connect harrow arms 80 to harrow frame 150 at a corresponding pair of lower harrow locating arm pivot connections 155 at spaced-apart locations connected to a strut 160 of harrow frame 150. The back lower harrow locating arm pivot connection 155 is arranged at a back end 165 of strut 160, and the front lower harrow locating arm pivot connection 155 is arranged at a front end 170 of strut 160.

Figure 3:
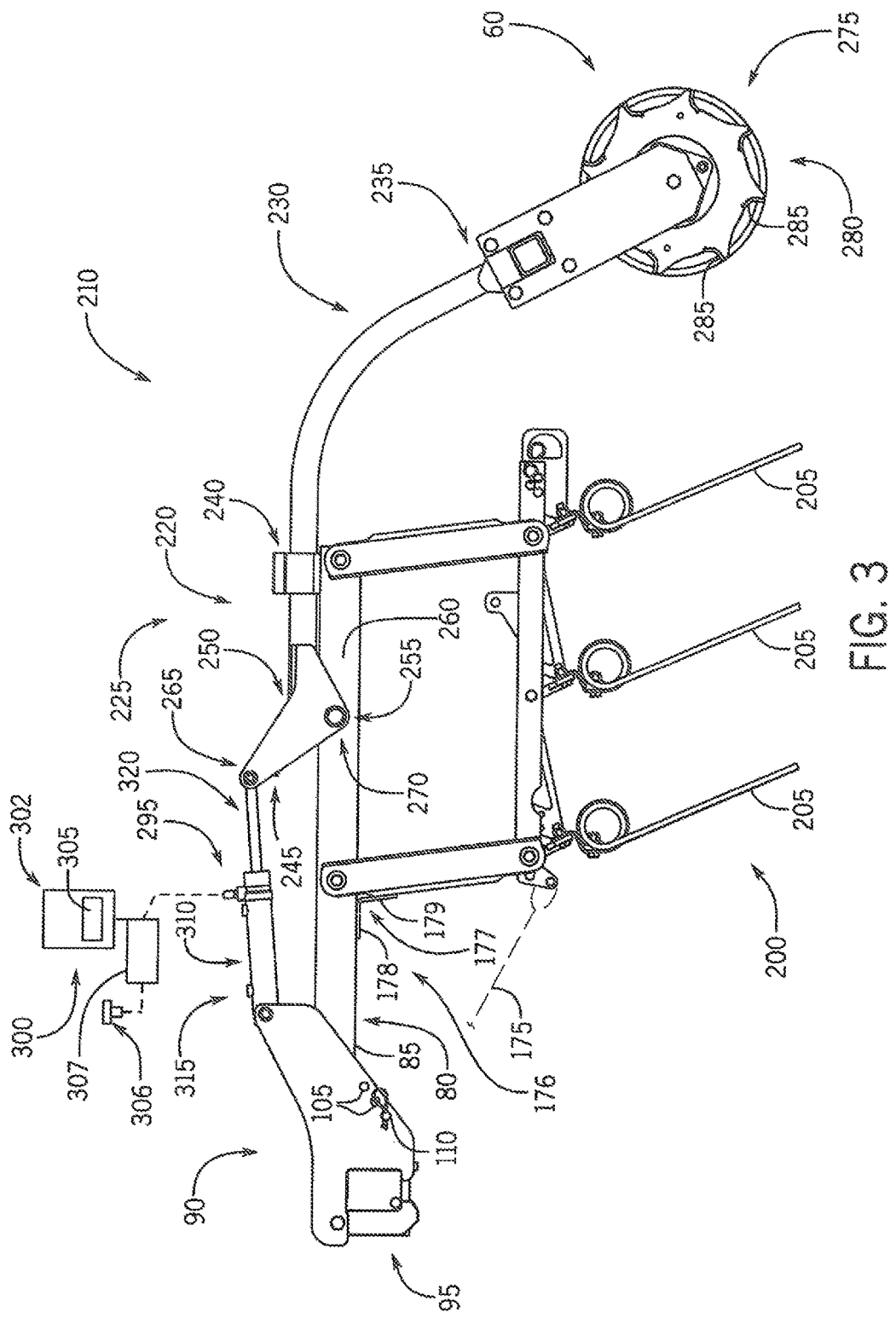
FIG. 3 is a side elevation view of the soil finishing system of FIG. 1.

Still referring to FIG. 2, upper and lower harrow locating arm pivot connections 140, 155 allow the harrow frame 150 to articulate by swinging longitudinally in a back/up and forward down direction(s) as guided by the pivoting movement of the harrow locating arms 130 with respect to the harrow arm 80 and the harrow frame 150 with respect to the harrow locating arms 130. This allows harrow 55 to define a nonuse position in which harrow frame 150 is generally freely suspended from harrow arm 80, such as when tillage implement 10 (FIG. 1) is raised to remove ground-engaging tillage tools 40 (FIG. 1) out of the soil. Harrow 55 defines an in-use position in which the harrow frame 150 swung back and up, such as when tillage implement 10 (FIG. 1) is being towed through a field and is lowered so ground-engaging tillage tools 40 (FIG. 1) engage and till the soil. During use, harrow locating arms 130 transversely locate harrow frame 150 while harrow 55 is towed by chain(s) 175 (FIG. 3) that are pulled taut while traveling and extends between and connects pin 110 (FIG. 3) in bracket(s) 90 to a front portion of harrow frame 150, such as to front end 170 of strut 160. When in the in-use position, harrow 55 is translated rearwardly with respect to the harrow arm 80, as permitted by chain(s) 175 (FIG. 3). This may move harrow frame 150 rearwardly so that intermediate bar 190 is arranged generally below locating arm pivot connection 140 of the rear locating arm 130.

Referring now to FIG. 3, movement of harrow frame 150 may be limited in a forward direction so that the nonuse position defines a forward movement limited position. The forward movement limited position corresponds to a position at which further forward movement of harrow 150 is prevented by limiting arrangement 176, shown here as stop 177. Upper leg 178 is attached to a lower wall of harrow arm 80 and lower leg 179 extends angularly down and rearward from the upper leg 178 so the upper and lower legs 178, 179 intersect each other and define an obtuse angle. A rearward facing surface of lower leg 179 faces and engages a forward facing surface of main wall 131 of the front locating arm 130 when the harrow frame 150 translates forward so that that stop 177 prevents further motion of harrow frame 150 in the forward direction to define the forward movement limited position as shown in FIG. 3. Limiting arrangement 176 may be arranged so that locating arms 130 angle slightly rearward when the harrow frame 150 is in the nonuse and forward movement limited position.

Still again to FIG. 2, struts 160 support multiple bars 180 of harrow frame 150, with the multiple bars 180 arranged transversely across harrow 55, generally perpendicular to struts 160. Harrow 55 is shown here with a three bar configuration in which front bar 185 is arranged toward a front end of harrow 55, intermediate bar 190 arranged behind front bar 185, and a back bar 195 arranged behind both of the front and intermediate bars 185, 190 toward a back end of harrow 55. Front, intermediate, and back bars 185, 190, 195 collectively support a first set of smoothing tools 200 that is configured to smooth the soil tilled by the ground-engaging tillage tools 40. The first set of smoothing tools 200 is represented as tines 205, shown here as spring tines.

Referring again to FIG. 1, tines 205 are spaced from each other and mounted to each of the front, intermediate, and back bars 185, 190, 195. Each of the tines 205 may be a multiple tine component with a pair of tine fingers that extend from spring coils at opposite sides of the tine 205 and a connecting segment that interconnects the coils and is captured by a plate arranged between the coils to mount the tine(s) 205 to a respective bar 185, 190, 195 of harrow frame 150. Different bars 185, 190, 195 may have different numbers of tines 205 mounted to them. For example, front bar 185 may have fewer tines 205 mounted to it than the number of tines 205 mounted to intermediate and/or back bars 190, 195. Tines 205 of different bars 185, 190, 195 may be staggered with respect to each other, with fingers of tines 205 of one of the bars 185, 190, 195 aligned within the gaps between adjacent fingers of tines 205 on a different bar(s)

185, 190, 195. This provides a collective drag path that substantially covers an entire width of a path tilled by main tillage implement 15 so that tines 205 of the three rows of bars 185, 190, 195 as shown can level the soil tilled by tillage tools 40.

Referring again to FIG. 3, finishing tool aims 210 connect finishing tools 60 to harrow arms 80. Each finishing tool arm 210 is shown as rectangular tubing with interconnected walls 215 (FIG. 2) that together provide a box configuration. Referring now to FIG. 3, finishing tool arm 210 has a straight front segment 220 toward front end 225 and a curved back segment 230 that extends from front segment 220 toward back end 235. In this way, at least a portion of front segment 220 of finishing tool arm 210 overlaps a portion of the harrow arm 80 and the back segment 230 of finishing tool arm 210 extends along a curved path rearward and downward toward back end 235. A support yoke 240 extends upwardly from an upper surface of harrow arm 80 and provides a U-shaped channel in which part of the front segment 220 sits and is transversely restrained when finishing tool arm 210 is in a downward position. Each finishing tool arm 210 includes bracket 245 at front end 225, with a portion of bracket 245 overlapping a corresponding portion of the harrow arm 80. Bracket 245 has a back segment 250 from which finishing tool arm 210 extends and a lower portion 255 with a pair of lower lobes 260 that extend over and sandwich the finishing tool, arm 210. A pair of upper lobes 265 extends up and forward at an angle from the lower lobes 260, above and in front of finishing tool arm front end 225. Bracket 245 is arranged to pivot with respect to the harrow arm 80, defining a finishing tool arm pivot connection 270. Finishing tool arm pivot connection 270 defines a pivot axis that extends transversely through harrow arm 80, shown with the pivot axis of finishing tool arm pivot connection 270 arranged generally above intermediate bar 190 when the harrow is in the nonuse position.

Referring again to FIG. 1, finishing tools 60 have a second set of smoothing tools 275 and are shown here as formed bar baskets 280, such as crumbler baskets, that are arranged trailing behind respective harrow sections 70, 75 (FIG. 1). Referring now to FIG. 2, smoothing tools 275 of formed bar baskets 280 are bars 285 that at least partially define the formed bar baskets 280. Bars 285 may be flat bars, round bars, or curved bars with semicircular or curved cross-sectional shapes. Bars 285 are shown here as spaced from each other and extending, helically to collectively define a helically slotted outer circumferential surface of the formed bar baskets 280 that rolls over and further levels soil tilled by tillage tools 40 (FIG. 1) after having been previously leveled by tines 205.

Referring again to FIG. 3, formed bar baskets 280 roll over the soil with pressure applied by down pressure system 290, shown as hydraulic down pressure system 295 which is controlled by control system 300. Control system 300 may include an HMI (human machine interface) configured to allow user to control the hydraulic down pressure system 295 and therefore control and adjust down pressure applied to finishing tool 60. Control system 300 may include an electronic controller 302 that has at least one master controller or implement controller, shown as controller 305. Controller 305 includes a microprocessor and may be implemented as a PLC (programmable logic controller) or other industrial computer, along with corresponding software and suitable memory for storing such software and hardware including interconnecting conductors for power and signal transmission and communication for controlling electronic, electro-mechanical, pneumatic, and/or hydraulic components, including control valves, actuators, and other components, of the hydraulic down pressure system 295 or other component of tillage implement 10. Control system 300 may be implemented with mechanical controls such as knob 306 of hydraulic control valve 307 that can be manually operated to control and adjust the pressure applied by down pressure system 290. The HMI and/or control knob 306 are typically mounted within a cab of the tractor that tows tillage implement 10 (FIG. 1) so the operator can adjust down pressure applied by down, pressure system 290 from within the cab, although it is understood that they may be mounted on the tillage implement 10 (FIG. 1) itself.

Still referring to FIG. 3, hydraulic down pressure system 295 is configured to actuate the finishing tool arm(s) 210 to apply down pressure to formed bar basket 280. This may be done by way of hydraulic cylinder(s) 310 that actuates finishing tool arm(s) 210 by pushing or pulling finishing tool arm bracket 245 by controlling pressure within hydraulic cylinder(s) 310 through control system 300 such as through electronic controller 302 or manually through control knob 306. Hydraulic cylinder 310 has front end 315 that is mounted between lobes 112 of harrow arm bracket 90 and back end 320 that is mounted between upper lobes 265 of finishing tool arm bracket 245. Since harrow arm bracket 90 is rigidly mounted with respect to harrow arm 80 and finishing tool arm bracket 245 is pivot mounted to the harrow arm 80 through finishing tool arm pivot connection 270, extending or retracting the piston of hydraulic cylinder pivots the bracket 245 about pivot connection 270 correspondingly press the formed bar basket 280 into the soil or withdraw the formed bar basket 280 with respect to the soil for controlling down pressure of the formed bar basket 280.

Many changes and modifications could be made to the invention without departing from the spirit thereof. The scope of these changes will become apparent from the appended claims.

We claim:
1. An agricultural tillage implement, comprising:
a main implement frame supporting a set of ground-engaging tillage tools for tilling soil during a tilling session for seedbed preparation; and
a soil finish system supported by the main implement frame for smoothing the soil tilled by the ground-engaging tillage tools; the soil finish system including:
a harrow supported in a trailing position with respect to the main implement frame, wherein the harrow includes a harrow frame with multiple bars arranged generally transversely with respect to a travel direction of the agricultural tillage implement with the multiple bars of the harrow frame including a front bar arranged toward a front end of the harrow, a back bar arranged toward a back end of the harrow, and an intermediate bar arranged between the front and back bars of the harrow, wherein the harrow includes a first set of smoothing tools supported by the front, back, and intermediate bars of the harrow frame for smoothing the soil tilled by the ground-engaging tillage tools;
a finishing tool supported in a trailing position with respect to the harrow with the finishing tool including a second set of smoothing tools for smoothing the soil tilled by the ground-engaging tillage tools;
a bracket having a leading end, a trailing end interconnected to the finishing tool and an intermediate portion pivotably connected to the harrow at a pivot point; and a down pressure system pivotably connected to the leading end of the bracket, the down pressure system configured to pivot the bracket about the pivot point so as to adjust down pressure of the finishing tool during the tilling session.

2. The agricultural tillage implement of claim 1, wherein the down pressure system is a hydraulic down pressure system configured to press the finishing tool against the soil.

3. The agricultural tillage implement of claim 2, wherein the finishing tool is a formed bar basket and the second set of smoothing tools includes at least one of flat bars, round bars, and curved bars, that at least partially define the formed bar basket.

4. The agricultural tillage implement of claim 3, wherein the harrow is a spring tine harrow with each of the forward, rear, and intermediate bars of the harrow supporting multiple spring tines that define the first set of smoothing tools.

5. The agricultural tillage implement of claim 1, wherein the harrow includes a harrow arm connected to the main implement frame and the harrow defines a nonuse position in which the harrow frame is generally freely suspended from the harrow arm, and wherein the finishing tool includes a formed bar basket supported by a finishing tool arm, wherein the pivot point is arranged generally above the intermediate bar when the harrow is in the nonuse position.

6. The agricultural tillage implement of claim 1, wherein the harrow is a spring tine harrow that includes:
 a harrow arm connected to the main implement frame;
 a pair of harrow locating arms that attaches the harrow arm to the harrow frame at a corresponding pair of harrow locating arm pivot connections;
wherein:
 the finishing tool is a formed bar basket finishing tool and the bracket is connected to the harrow arm at the pivot point with a pivot axis that extends transversely through the harrow arm, and wherein the bracket extends from the pivot point rearwardly beyond the harrow arm; and
 the down pressure system is a hydraulic down pressure system configured to move the bracket to press the formed bar basket against the soil.

7. The agricultural tillage implement of claim 6, further comprising a control system configured to adjust a pressure applied by the down pressure system.

8. The agricultural tillage implement of claim 7, wherein the control system includes an electronic controller configured to adjust the pressure applied by the down pressure system.

9. The agricultural tillage implement of claim 7, wherein the control system includes an adjustment knob arranged with respect to a hydraulic control valve for manually adjusting the pressure applied by the down pressure system.

10. The agricultural tillage implement of claim 6, further comprising a limiting arrangement that is configured to limit forward movement of the harrow frame with respect to the harrow arm.

11. The agricultural tillage implement of claim 10, wherein the limiting arrangement includes a stop that is supported with respect to the harrow arm to engage at least one of the harrow locating arms to prevent further forward movement of the at least one of the harrow locating arms and define a forward movement limited position of the harrow frame.

12. An agricultural tillage implement, comprising:
 a main implement frame supporting a set of ground-engaging tillage tools for tilling soil; and
 a soil finish system supported by the main implement frame for smoothing the soil tilled by the ground-engaging tillage tools; the soil finish system including:
  a spring harrow supported by the main implement frame, wherein the spring harrow includes a harrow arm connected to the main implement frame and a harrow frame suspended from the harrow arm, wherein the harrow frame includes a front bar arranged toward a front end of the harrow, a back bar arranged toward a back end of the harrow, and an intermediate bar arranged between the front and back bars of the harrow, and wherein each of the front bar, the back bar, and the intermediate bar supports spring tines for smoothing the soil tilled by the ground-engaging tillage tools;
  a finishing tool arm having a leading end, a trailing end and intermediate portion pivotably connected to the harrow arm at a finishing tool arm pivot connection; and
  a finishing tool operatively connected to the trailing end of the finishing tool arm and supported by the spring harrow, wherein the finishing tool arm pivot connection is arranged generally above the intermediate bar of the harrow.

13. The agricultural tillage implement of claim 12 further comprising a hydraulic down pressure system configured to move the finishing tool arm to press the finishing tool against the soil.

14. The agricultural tillage implement of claim 13 wherein the finishing tool arm pivot connection that is arranged generally above the intermediate bar of the harrow when the harrow defines a nonuse position in which the harrow frame is generally freely suspended from the harrow arm.

15. The agricultural tillage implement of claim 12, wherein the finishing tool is a formed bar basket.

16. The agricultural tillage implement of claim 15 wherein the formed bar basket includes at least one of flat bars, round bars, and curved bars, that at least partially define the formed bar basket.

17. An agricultural tillage implement, comprising:
 a main implement frame supporting a set of ground-engaging tillage tools for tilling soil; and
 a soil finish system supported by the main implement frame for smoothing the soil tilled by the ground-engaging tillage tools; the soil finish system including:
  a spring harrow supported by the main implement frame, wherein the spring harrow includes,
   a harrow arm connected to the main implement frame;
   a front locating arm having a lower end and an opposite upper end that is connected to the harrow arm at a front harrow locating arm pivot connection;
   a rear locating arm having a lower end and an opposite upper end connected to the harrow arm at a rear harrow locating arm pivot connection;
   a harrow frame suspended from lower ends of the front and rear locating arms and including a front bar arranged toward a front end of the harrow, a back bar arranged toward a back end of the harrow, and an intermediate bar arranged between the front and back bars of the harrow, and wherein each of the front bar, the back bar, and the intermediate bar supports spring tines for smoothing the soil tilled by the ground-engaging tillage tools;

a finishing tool arm having a leading end, a trailing end and an intermediate portion pivotably connected to the harrow arm at a finishing tool arm pivot connection that defines a pivot axis that extends transversely through the harrow arm; and a finishing tool operatively connected to the trailing end of the finishing tool arm; and a hydraulic down pressure system pivotably connected to the leading end of the the finishing tool arm and being configured to pivot the finishing tool arm about the finishing tool arm pivot connection so to press the finishing tool against the soil.

18. The agricultural tillage implement of claim 17, further comprising a stop that is supported with respect to the harrow arm to engage the front locating arm to prevent further forward movement of the front locating arm and define a forward movement limited position of the harrow frame.

* * * * *